UNITED STATES PATENT OFFICE.

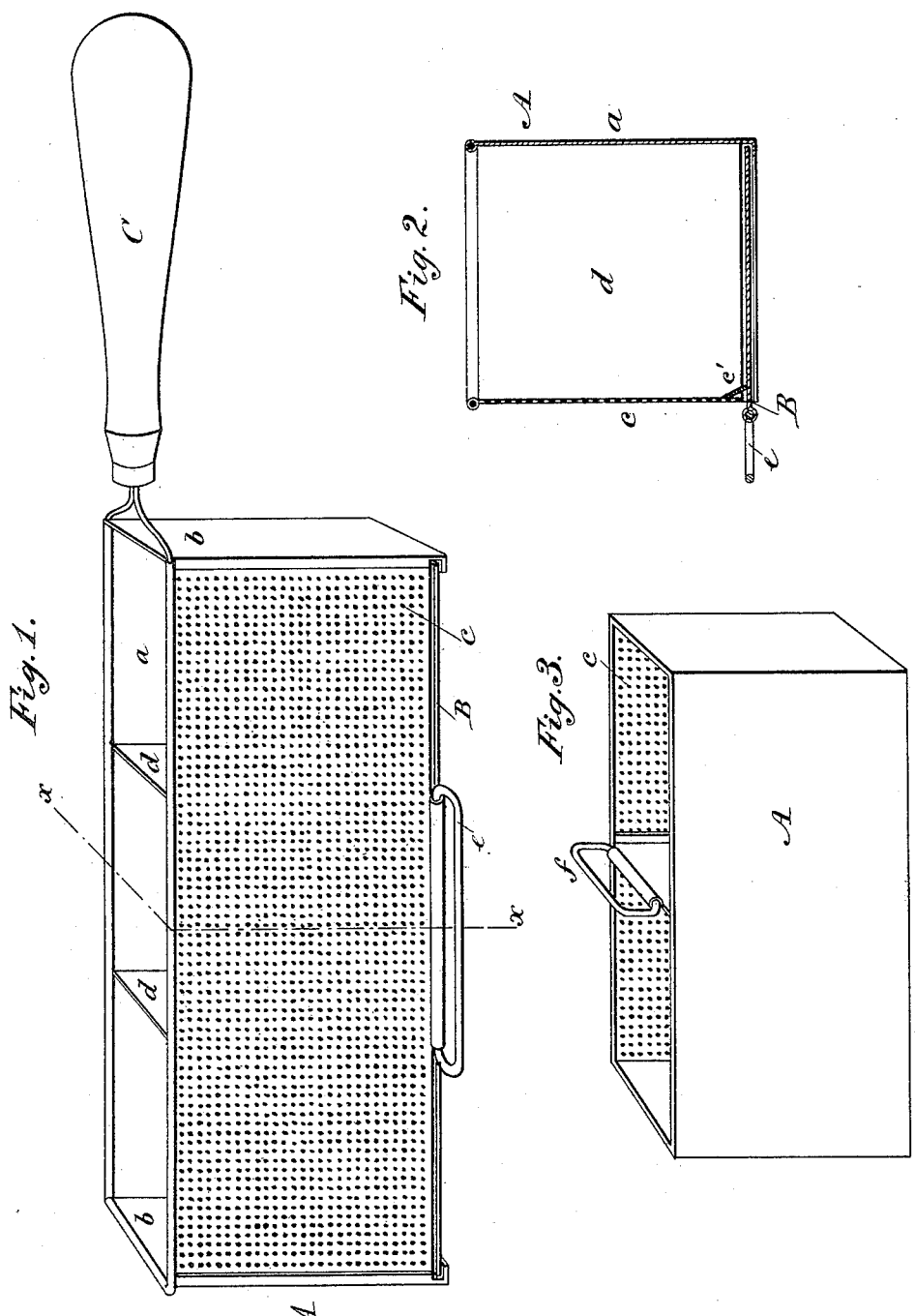

WILLIAM H. LITTLETON, OF CLAYTON, MICHIGAN.

EGG-POACHER.

SPECIFICATION forming part of Letters Patent No. 399,422, dated March 12, 1889.

Application filed March 23, 1888. Serial No. 268,221. (No model.)

*To all whom it may concern:*

Be it known that I, WILLIAM H. LITTLETON, of Clayton, in the county of Lenawee and State of Michigan, have invented a new and Improved Egg-Poacher, of which the following is a specification, reference being had to the annexed drawings, forming a part thereof, in which—

Figure 1 is a perspective view of my improved egg-poacher. Fig. 2 is a transverse section taken on line $x\ x$ in Fig. 1, and Fig. 3 is a perspective view of a modified form of the poacher.

Similar letters of reference indicate corresponding parts in all the views.

The object of my invention is to provide a simple and effective device for poaching eggs and placing them unbroken upon a platter.

The invention will first be described and then specifically claimed.

The body A of my improved egg-poacher is formed of an imperforate back, $a$, and ends $b$, a perforated side, $c$, and transverse partitions $d$. The poacher is preferably made of sheet-tin, and the lower edges of the tin are bent inwardly, forming a support for the sliding bottom B, which is adapted to close all of the compartments of the poacher. The lower edge of the perforated side $c$ is provided with a lip, $c'$, projecting inwardly and adapted to remove the egg from the bottom B as the said bottom is drawn out.

For convenience in inserting and withdrawing the bottom B it is provided at one of its edges with a ring, $e$. Poachers of the larger sizes are provided with a wooden handle, C, as shown in Fig. 1.

The modified form of poacher shown in Fig. 3 is provided with a wire loop, $f$, attached to the central partition for convenience in handling.

My improved poacher is placed in a pan of boiling water, and when it becomes as warm as the water an egg is broken and dropped into each compartment, and after the eggs are sufficiently cooked the poacher is lifted out of the water and the water is allowed to drain from the eggs through the perforated side $c$. The poacher is now held over a suitable receptacle and the bottom withdrawn. The scraper or clearer lip $c'$, extending at an incline from the lower edge of the side $c$ to the upper face of the bottom, loosens the eggs therefrom as it is slid outwardly and prevents the bottom from carrying the eggs against the perpendicular side $c$, which would almost invariably cause the eggs to be broken; but the inwardly-extending clearing or scraping lip $c'$ effectually prevents this.

Having thus described my invention, I claim as new and desire to secure by Letters Patent—

1. In an egg-poacher, the combination, with the body A, formed of the imperforate back $a$, imperforate ends $b$, the perforated side $c$, and the inwardly-projecting clearing-lip $c'$, of the removable bottom B, having its upper face adjacent to the clearing-lip $c'$, substantially as specified.

2. An egg-poacher having a sliding bottom and a transverse scraping-lip extending inwardly from the lower edge of that side of the poacher under which the bottom slides to the upper face of said bottom, whereby the egg will be loosened from the bottom as it is withdrawn, substantially as set forth.

3. An egg-poacher consisting of an oblong frame having a sliding bottom completely closing its lower end, and imperforate partitions extending transversely across said body and upper face of the sliding bottom, one side of the body being foraminated, substantially as set forth.

WILLIAM H. LITTLETON.

Witnesses:
GEO. W. LITTLETON,
R. W. CLEVELAND.